(12) United States Patent　(10) Patent No.: US 9,312,930 B2
Yu　(45) Date of Patent: Apr. 12, 2016

(54) TELECOMMUNICATION TRANSMISSION METHOD AND SYSTEM

(75) Inventor: Yifan Yu, Beijing (CN)

(73) Assignee: FRANCE TELECOM, Paris (FR)

( * ) Notice: Subject to any disclaimer, the term of this patent is extended or adjusted under 35 U.S.C. 154(b) by 491 days.

(21) Appl. No.: 13/519,094

(22) PCT Filed: Dec. 21, 2010

(86) PCT No.: PCT/IB2010/003504
§ 371 (c)(1),
(2), (4) Date: Aug. 3, 2012

(87) PCT Pub. No.: WO2011/077260
PCT Pub. Date: Jun. 30, 2011

(65) Prior Publication Data
US 2012/0294249 A1　Nov. 22, 2012

(30) Foreign Application Priority Data
Dec. 25, 2009　(WO) ................ PCT/CN2009/076079

(51) Int. Cl.
*H04B 7/02*　(2006.01)
*H04B 7/06*　(2006.01)

(52) U.S. Cl.
CPC .............. *H04B 7/024* (2013.01); *H04B 7/0632* (2013.01); *H04B 7/0639* (2013.01)

(58) Field of Classification Search
CPC .. H04B 7/0639; H04B 7/0417; H04B 7/0634; H04B 7/0478; H04L 2025/03426; H04L 25/03343
See application file for complete search history.

(56) References Cited

U.S. PATENT DOCUMENTS

| | | | |
|---|---|---|---|
| 2007/0049218 A1 | 3/2007 | Gorokhov et al. | |
| 2007/0191067 A1 | 8/2007 | Nguyen et al. | |
| 2009/0323849 A1* | 12/2009 | Bala et al. | 375/267 |
| 2011/0206154 A1* | 8/2011 | Ding et al. | 375/267 |
| 2011/0211647 A1* | 9/2011 | Alexiou et al. | 375/267 |
| 2012/0321017 A1* | 12/2012 | Lee et al. | 375/296 |

FOREIGN PATENT DOCUMENTS

EP　1895677 A2　3/2008

OTHER PUBLICATIONS

International Search Report and Written Opinion dated Jun. 22, 2011 for corresponding International Application No. PCT/IB2010/003504, filed Dec. 21, 2010.

* cited by examiner

*Primary Examiner* — Jung Park
(74) *Attorney, Agent, or Firm* — David D. Brush; Westman, Champlin & Koehler, P.A.

(57) ABSTRACT

A method of scheduling a signal transmission to a user equipment in a transmitter system, said transmitter system comprising a plurality of spatially distributed transmitters for transmitting signals to said user equipment and a base station for controlling said plurality of spatially distributed transmitters, said method comprising, for said base station, the acts of obtaining for the user equipment a quantization vector estimating the state of the channel between the transmitter system and the user equipment, obtaining for the user equipment a weighting factor representing an attenuation of the channel between the user equipment and at least one of the plurality of spatially distributed transmitters, and scheduling a signal transmission to the user equipment using the obtained quantization vector weighted with the obtained weighting factor.

11 Claims, 6 Drawing Sheets

TELECOMMUNICATION TRANSMISSION METHOD AND SYSTEM

CROSS-REFERENCE TO RELATED APPLICATIONS

This Application is a Section 371 National Stage Application of International Application No. PCT/IB2010/003504, filed Dec. 21, 2010, which is incorporated by reference in its entirety and published as WO 2011/077260 on Jun. 30, 2011, in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates in general to telecommunication networks and more specifically to telecommunication transmission scheduling schemes.

BACKGROUND OF THE DISCLOSURE

The fourth generation of telecommunication networks (4G) encompasses Multi-User Multiple-Input Multiple Output (MU-MIMO) systems. A MU-MIMO system allows multiple users to communicate using a plurality of transmission antennas both on each user equipment and each network transmission unit (e.g. Base Station, eNodeB etc. . . . ). A MU-MIMO system allows therefore multiple transmission paths for spatial division multiplexing. The MU-MIMO system may thus have multiple users served at the same time on the same subcarrier by means of spatial separation. The main challenge in MU-MIMO systems is that not all antennas can cooperate among different user equipments. Therefore, the network transmission unit has to manage inter-user interferences. This is in particular the case in systems such as Distributed Antenna Systems (DAS) or Coordinated Multi-Point transmission/reception (CoMP) systems. In such a system, a Base Station (BS) is equipped with a powerful Base Band Unit (BBU) and is connected to a plurality of Remote Radio Units (RRU) over e.g. high-speed optical fibers. This allows covering large geographical areas. The base band processing as well as radio resource and network management functionalities are performed by the BBU. The RRU are equipped with multiple antennas and perform conversion between Radio Frequency (RF) and digital Intermediate Frequency (IF) signals. In such a DAS system, multiple users may get paired in order to collaborate with each others for transmission.

A MU-MIMO system uses a precoding scheme and a corresponding coding scheme in the network transmission unit for spatial user separation. There are actually two kinds of precoding schemes: Channel Vector Quantization (CVQ) described in "Comparison between MU-MIMO codebook-based channel reporting techniques for LTE downlink" (Philips, 3GPP TSG RAN WG1, 46bis R1-062483, October 2006) and Per User Unitary and Rate Control (PU2RC) described in "Downlink MIMO for EUTRA" (Samsung, 3GPP TSG-RAN WG1, 44 R1-060335, February 2006). In CVQ, the network transmission unit receives a feedback or codebook index from the user equipment that indicates a codebook entry. The codebook is stored both in the network transmission unit and in the user equipments. The codebook is a matrix that comprises quantization channel vectors. The codebook index indicates the quantization channel vector selected by the user equipment. The quantization channel vector selected by the user equipment corresponds to the quantization channel vector of the codebook which is the most representative of the actual used channel estimated by the user equipment. Using the codebook index, the network transmission unit may thus determine in the codebook which quantization channel vector or precoder represents the best the channel of the user and schedule the different users on different subcarriers accordingly. The other precoding scheme PU2RC defines possible precoding non-quantization vectors. In this case, the feedback received by the network transmission unit indicates a preferred precoder from a set of predefined precoders. There is no calculation and therefore there cannot be any optimization based on a feedback from the user equipment. In both existing precoding schemes, once a precoder has been selected, a scheduling scheme is performed by the network transmission unit. The network transmission unit schedules thus the users for transmission according to the combination of quantization channel vectors that gives the best throughput.

Although DAS systems allows increasing network capacity and coverage, the existing precoding schemes and corresponding scheduling schemes are not convenient in such systems for reducing inter-user interferences. This is due to the fact that a plurality of RRU are spread around a given UE that perceives therefore a plurality of different propagation paths. The given UE may thus, in such a case, not detect the signal strengths of some of the RRU when they are under its sensitivity (e.g. when signals are deeply attenuated by the environment) and therefore consider them as equal to zero. In this case, the BS, which does not know that the UE does not receive every signal from every RRU as the quantization channel vector of the corresponding index does not indicate it, performs the scheduling while assuming wrongly that the signal transmitted by all the RRU are actually received and exploited by the UE. Resources are therefore not efficiently or optimally scheduled (i.e. not scheduled in an optimum way).

Today there is no solution to efficiently schedule resources that allow optimizing network resources and thus improving efficiency of such wireless telecommunication systems.

Today there is a need for a scheduling solution that can be easily implemented on the existing communication infrastructures.

SUMMARY

An embodiment of the invention proposes a method for allocating resources to a plurality of telecommunication nodes in a telecommunication network.

For example, a method is provided for scheduling a signal transmission to a user equipment in a transmitter system, said transmitter system comprising a plurality of spatially distributed transmitters for transmitting signals to said user equipment and a base station for controlling said plurality of spatially distributed transmitters, said method comprising, for said base station:

obtaining for the user equipment a quantization vector estimating the state of the channel between the transmitter system and the user equipment, obtaining for the user equipment a weighting factor representing an attenuation of the channel between the user equipment and at least one of the plurality of spatially distributed transmitters, scheduling by the base station a signal transmission to the user equipment using the obtained quantization vector weighted with the obtained weighting factor.

An embodiment of the invention also proposes a transmitter system for scheduling a signal transmission to a user equipment, said transmitter system comprising:

a plurality of spatially distributed transmitters for transmitting signals to said user equipment, at least one user equipment, and, a base station for controlling said plurality of spatially distributed transmitters, wherein said base station is configured to:

obtain for the user equipment a quantization vector estimating the state of a channel between the transmitter system and the user equipment, obtain for the user equipment a weighting factor representing an attenuation of the channel between the user equipment and at least one of the plurality of spatially distributed transmitters, and schedule a signal transmission to the user equipment using the obtained quantization vector weighted with the obtained weighting factor.

An embodiment of the invention also proposes aA base station for scheduling a signal transmission to a user equipment in a transmitter system, said transmitter system comprising a plurality of spatially distributed transmitters for transmitting signals to said user equipment and the base station for controlling said plurality of spatially distributed transmitters, wherein the base station is configured to:

obtain for the user equipment a quantization vector estimating the state of a channel between the transmitter system and the user equipment, obtain for the user equipment a weighting factor representing an attenuation of the channel between the user equipment and at least one of the plurality of spatially distributed transmitters, and schedule a signal transmission to the user equipment using the obtained quantization vector weighted with the obtained weighting factor.

An embodiment of the invention also proposes a user equipment configured for use in a transmitter system, said transmitter system comprising a base station and a plurality of spatially distributed transmitters for transmitting signals to said user equipment, wherein said user equipment k comprises:

an input to receive a reference signal;

and wherein the user equipment is configured to compute a channel quality information CQI according to:

$$CQI_k^{new} = \frac{|R_k \cdot \tilde{h}_k^H|^2}{N_0 + |R_k \times \tilde{h}_k^H|^2}$$

where $\tilde{h}_k^H$ is an obtained quantization vector weighted with an obtained weighting factor, $R_k = \sqrt{P/M_t} h_k$ is the reference signal received by the user equipment k, $h_k$ is the obtained quantization vector, $M_t$ is the number of the transmission antennas of the transmitter system, P is a transmission power of the base station and $N_0$ is noise power.

An embodiment of the invention also proposes a computer-readable medium having computer-executable instructions to enable a computer system to perform a method of scheduling a signal transmission to a user equipment in a transmitter system, said transmitter system comprising a plurality of spatially distributed transmitters for transmitting signals to said user equipment and a base station for controlling said plurality of spatially distributed transmitters, said method comprising, for said base station:

obtaining for the user equipment a quantization vector estimating the state of the channel between the transmitter system and the user equipment, obtaining for the user equipment a weighting factor representing an attenuation of the channel between the user equipment and at least one of the plurality of spatially distributed transmitters, scheduling by the base station a signal transmission to the user equipment using the obtained quantization vector weighted with the obtained weighting factor.

BRIEF DESCRIPTION OF THE DRAWINGS

Embodiments of the present invention will now be described solely by way of example and only with reference to the accompanying drawings, where like parts are provided with corresponding reference numerals, and in which.

DETAILED DESCRIPTION OF ILLUSTRATIVE EMBODIMENTS

The following are descriptions of exemplary embodiments that when taken in conjunction with the drawings will demonstrate the above noted features and advantages, and introduce further ones.

In the following description, for purposes of explanation rather than limitation, specific details are set forth such as architecture, interfaces, techniques, devices etc. . . . , for illustration. However, it will be apparent to those of ordinary skill in the art that other embodiments that depart from these details would still be understood to be within the scope of the appended claims.

Moreover, for the purpose of clarity, detailed descriptions of well-known devices, systems, and methods are omitted so as not to obscure the description of the present system. Furthermore, routers, servers, nodes, gateways or other entities in a telecommunication network are not detailed as their implementation is beyond the scope of the present system and method.

Unless specified otherwise, the exemplary embodiment will be described hereafter in its application to a base station of a Frequency-Division Duplexing (FDD) wireless telecommunication network.

In addition, it should be expressly understood that the drawings are included for illustrative purposes and do not represent the scope of the present system.

Figure 1:
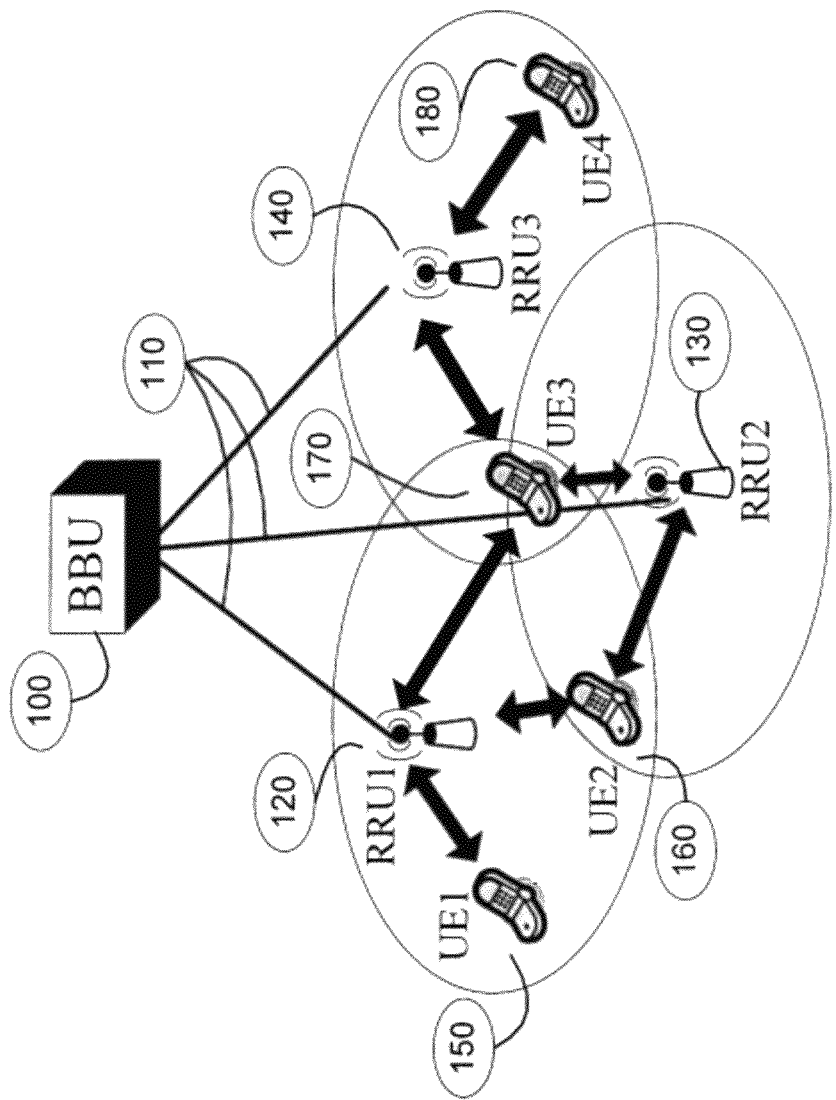
FIG. 1 schematically illustrates a system according to an embodiment of the present invention.

FIG. 1 describes an illustrative embodiment of the system according to the invention.

The transmitter system (100, 110, 120, 130, 140) comprises:
- a plurality of spatially distributed transmitters (120, 130, 140) for transmitting signals to said user equipment, and,
- a Base Station or Base Band Unit (BBU) 100 for controlling, via communication links 110, the plurality of spatially distributed transmitters (120, 130, 140). Communication links 110 allows communication between the base station 100 and the plurality of spatially distributed transmitters (120, 130, 140). The system according to an embodiment of the invention comprises at least one user equipment (150, 160, 170, 180). For a given user equipment, the channel is defined as being the communication link between the transmitter system (100, 110, 120, 130, 140) and one of the user equipments (150, 160, 170, 180). In other words, the channel is a transmission link comprising a signal or a plurality of signals to be transmitted between the Base Station and a user equipment (downlink channel) or between a user equipment and the Base Station (uplink channel). In MIMO systems, a signal may be decomposed in several sub-signals or signal components that are transmitted by the Base Station to the user equipment using different transmitters. In others words, a user equipment may receive a signal transmitted by the Base Station from a plurality of transmitters, each one transmitting one (or a plurality of) copy(ies) or a part(s) or a component(s) of the signal. The channel is the communication link to transmit all signals from the Base Station to the user equipment. Each radio link between a given transmitter and a user equipment may therefore be defined as a sub-channel. In MIMO systems, each transmitter may comprise a plurality of transmission antennas.

As the Base Station transmits signal to the user equipment (downlink channel) via the transmitters, the user equipment may use the received signal to calculate the corresponding Channel Quality Information (CQI). The Channel Quality Information is used in MU-MIMO systems along with the Channel Direction Information (CDI) to further schedule signal transmissions to user equipment of the communication network. The CDI represents the codebook index n, which corresponds to a quantization vector stored in a codebook. More precisely, the codebook of unit-norm row vectors of size $N=2^B$ is expressed as:

$$C=\{c_1, \ldots c_N\} \quad (1).$$

The quantization vector $\hat{h}_k$ is determined according to the minimum Euclidean distance criterion, such that:

$$\hat{h}_k = c_n, n = \arg\max_{i=1,\ldots,N} |h_k c_i^H|. \quad (2)$$

The codebook C is previously known to (i.e. stored in) the user equipments and the Base Station. It is usually defined as the Discrete Fourier Transformation (DFT) matrix where the quantisation vectors are obtained by truncating the top rows of the DFT matrix of size N. Each user equipment may estimate its actual channel $h_k$ and feed back the index n to the Base Station with B bits. Parameter n may be considered as the channel direction information (CDI) of k-th user equipment. The quantization vector is a quantized estimation of the channel estimated by the user equipment. The scheduling of user equipments is performed by calculating the achievable sum-rate R(S) for a set of user equipments S using the CQI and the quantization vector for each user equipment. Usually, the user equipment estimates the downlink channel using the signal transmitted by the Base Station and sends or feedback to the Base Station the index which corresponds to the quantization vector estimating at best the channel. The user equipment also calculates the CQI and feedbacks it to the Base Station. Once received, the codebook index is used by the Base Station to retrieve the corresponding quantization vector in the stored codebook. The Base Station uses then the quantization vector and the received CQI to calculate the achievable sum-rate for each user equipment in order to eventually schedule a signal transmission to the user equipments with the maximum sum-rate. An illustrative embodiment of scheduling is described here under in reference to Table 1.

Figure 2:
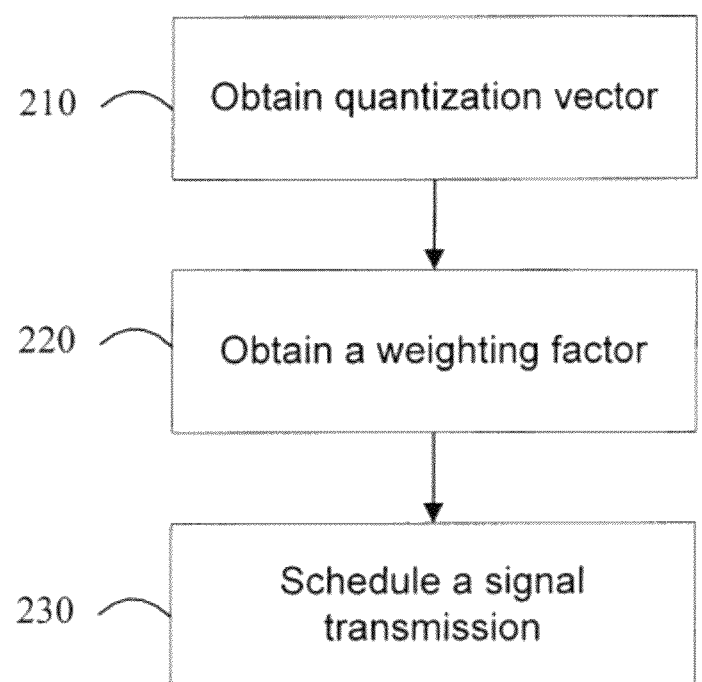
FIG. 2 schematically illustrates a method according to an embodiment of the present invention.

FIG. 2 describes an illustrative embodiment of the method according to the invention. The method allows scheduling a signal transmission to a user equipment (150, 160, 170, 180) (in reference to FIG. 1) in a transmitter system (100, 110, 120, 130, 140).

In the method according to an embodiment of the invention, the base station obtains for the user equipment, in an act 210, a quantization vector estimating the state of the channel between the transmitter system and the user equipment. As described here above, the quantization vector may be retrieved by the Base Station from the codebook stored on said Base Station using e.g. an index received from the user equipment. For example, in reference to FIG. 1, the quantization vector may be represented by H=(h1, h2, h3), wherein each components h1, h2, h3 is an estimation of the sub-channel for each transmitter (respectively RRU1, RRU2 and RR3).

As shown on FIG. 1, for example, user equipment UE2 160 may only receive signal components from transmitter RRU1 120 and transmitter RRU2 130, but not for transmitter RRU3 140 as the user equipment is not within the coverage of said transmitter RRU3 140. Consequently, the signal transmitted by the Base Station 100 to user equipment UE2 160 is attenuated as the user equipment UE2 160 does not receive all the signal components. The base station obtains for the user equipment, in an act 220, a weighting factor representing an attenuation of the channel between the user equipment and at least one of the plurality of spatially distributed transmitters. The weighting factor may be an invisibility vector, wherein said invisibility vector comprises components indicating of which of the transmitters (120, 130, 140) the user equipment is under the coverage (i.e. representing the attenuation of the channel). For instance, as described in FIG. 1, the user equipment UE2 160 is within the coverage of transmitter RRU1 120 and transmitter RRU2 130, but not of transmitter RRU3 140. Therefore, in the transmitter system comprising three transmitters respectively RRU1, RRU2 and RRU3, the invisibility vector for user equipment UE2 may be defined as (1, 1, 0), wherein 1 indicates that the user equipment is within the coverage of a transmitter and 0 indicates that the user equipment is not within the coverage of a transmitter.

The base station schedules, in an act 230, a signal transmission to the user equipment using the obtained quantization vector weighted with the obtained weighting factor. For example, in reference to FIG. 1, the quantization vector (h1, h2, h3) obtained by the Base Station in act 210 may be multiplied by the invisibility vector (1, 1, 0) to further schedule a signal transmission to the user equipment using the resulting vector (h1, h2, 0). This has for effect to allow the Base Station to schedule a signal transmission to the user equipment by taking into account the signal which is actually received and exploited by the user equipment.

In order to create the invisibility vector, the user equipment may send out to the Base Station some reference signals (e.g. Sounding Reference Signal (SRS) defined in 3GPP LTE) for uplink measurement. The Base Station may then estimate whether its signal may reach the user equipment via checking which reference signals corresponding to a given transmitter or antenna has actually reach the user equipment. In other words, the Base Station is informed by the user equipment of which transmitters the user equipment may actually receive signal components from.

As a signal transmitted by the Base Station received by the user equipment, has to be usable by the user equipment. Consequently, a threshold for assessing the usability of a signal by the user equipment may be used to define the invisibility vector $V_k$ as follows:

$$V_{k,j} = \begin{cases} 1 & S_{k,j} \geq \alpha \\ 0 & S_{k,j} < \alpha \end{cases} \quad (3)$$

where $S_{i,j}$ denotes the strength of the reference signal from user equipment k to transmitter j and $\alpha$ is the receiver sensitivity threshold of the user equipment. Although there is no channel reciprocity between uplink and downlink in FDD system, it is practical to use signal reference such as e.g. SRS over uplink to estimate the possibility that signal over downlink may reach the user equipment because the link budget estimation prior to the system deployment may ensure the downlink signal is visible to the user equipment as long as the Base Station is able to detect the signal from the user equipment. In the method according to an embodiment of the invention, the signal is usable by the user equipment when the user equipment is within the coverage of a transmitter, and vice-and-versa, i.e. in both cases when $S_{k,j} \geq \alpha$.

After having obtained the quantization vector $\hat{h}_k$ and the invisibility vector $V_k$, the Base Station may construct the channel vector oriented to user equipment k as follows:

$$\tilde{h}_k = \hat{h}_k \cdot \text{diag}\left(V_k \cdot \sqrt{\frac{n \cdot M_e}{T_k}}\right) \quad (4)$$

where n is the number of transmitters, $M_e$ is the amount of antennas in each transmitter and $T_k$ refers to the number of transmission antennas whose signal may be received (and are usable) by the UE.

Therefore:

$$T_k = \text{sum}(V_k) \quad (5)$$

$$T_k \leq M_t \quad (6)$$

where sum(.) represents the sum of the elements of the vector. $\sqrt{n \cdot M_e / T_k}$ ensures that the norm of $\tilde{h}_k$ is 1. In the scheduling stage, as described here under, the Base Station exploits $\tilde{h}_k$ instead of $\hat{h}_k$ to determine or select the user equipments for further transmission.

In existing solutions, the user equipment calculates the CQI using the following formulas:

$$CQI_k = \frac{\frac{P}{M_t}|h_k \hat{h}_k^*|^2}{N_0 + \frac{P}{M_t}(\|h_k\|^2 - |h_k \hat{h}_k^*|^2)} = \frac{|R_k \cdot \hat{h}_k^H|^2}{N_0 + |R_k \times \hat{h}_k^H|^2} \quad (7)$$

where $M_t$ is the number of transmission antennas of the transmitter system (i.e. the total of transmission antennas of all the transmitters), P is the transmission power of the Base Station and $N_0$ is the noise power, $R_k = \sqrt{P/M_t} h_k$ is the reference signal, e.g. over each transmission antenna, received by the k-th user equipment. The operation of ($\cdot$) and ($\times$) in equation (7) refer to the inner-product and cross-product of two vectors, respectively.

In the method according to an embodiment of the invention, the user equipment may calculate the CQI, based on the received signal, by taking into account the attenuation (and assuming the same signal visibility in downlink and uplink as previously described), using the following formulas:

$$|h_k \tilde{h}_k| = \sqrt{\frac{n \cdot M_e}{T_k}} |h_k \hat{h}_k^H| \quad (8)$$

and $$CQI_k^{new} = \frac{\frac{P}{T_k}|h_k \hat{h}_k^H|^2}{\frac{1}{\tilde{n}} + \frac{P}{n \cdot M_e}(\|h_k\|^2 - \frac{n \cdot M_e}{T_k}|h_k \hat{h}_k^H|^2)} \quad (9)$$

where $\tilde{P} = P_t / N_0$ and $P_t$ is the transmission power of a transmitter, Finally:

$$CQI_k^{new} = \frac{|R_k \cdot \tilde{h}_k^H|^2}{N_0 + |R_k \times \tilde{h}_k^H|^2} \quad (10)$$

Although $R_k$ in (9) still represents the Base Station reference signal sensed by the user equipment, it may be expressed as $R_k = \sqrt{P/M_e} h_k$.

Figure 3:
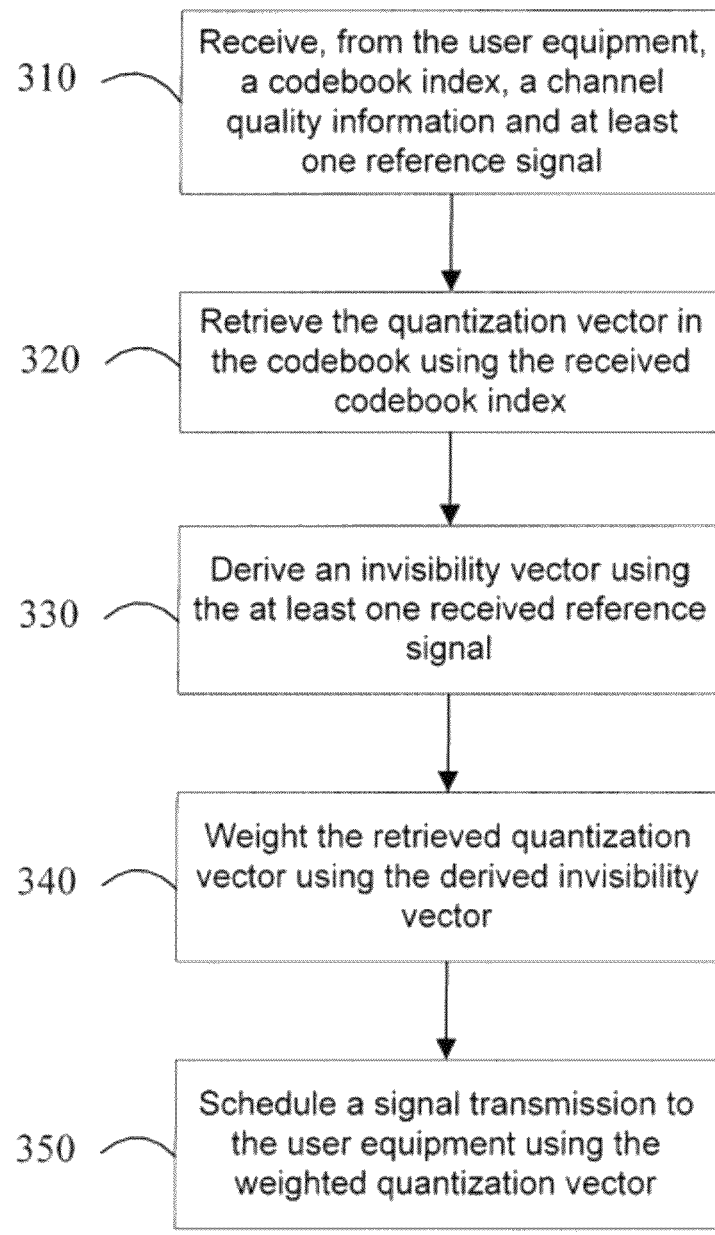
FIG. 3 schematically illustrates a method according to an embodiment of the present invention.

FIG. 3 describes an illustrative embodiment of the method according to an embodiment of the invention. The user equipment calculates, using equation (10), the CQI using the signal received on downlink from the transmitters. This CQI is based on the signal components which are usable by the user equipment and that takes into account the transmitters the user equipment is within the coverage of.

In an act 310, the user equipment sends or feedbacks the CQI along with its preferred quantization vector index (i.e. codebook index) and at least one reference signal to the Base Station. In other words, the Base Station receives, from the user equipment, a channel quality information CQI, a codebook index CDI, and at least one reference signal. In the Base Station, the Base Band Unit (BBU), for example, may estimate the reference signals received from the user equipment via the transmitters (e.g. via the RRUs). The at least one reference signal allows the Base Station identifying the transmitters the user equipment is within the coverage of, in other words which signal components may be received and used by the user equipment.

In act 320, the Base Station may retrieve the quantization vector in the codebook (stored in the Base Station) using the received codebook index.

In act 330, the Base Station may derive the invisibility vector (as explained here above) using the at least one received reference signal.

In act 340, the Base Station may weight the retrieved quantization vector using the derived invisibility vector e.g. using equation (4).

Finally, in act 350, the Base Station may schedule, using for instance the method described here under in reference to Table 1, a signal transmission to the user equipment using the weighted quantization vector.

As an example, the uplink reference signal estimation may result for UE1 (in reference to FIG. 1) to an invisibility vector of (1,0,1) and the quantization vector indicated by the codebook index (CDI) feedback may be (h1,h2,h3), the weighted quantization vector specific to UE1 then may equal to (h1,0,h3).

The paragraph below describes the existing standardized scheduling method, based on a precoding matrix of quantization vectors of the user equipments.

At the Base Station, the assembled precoding matrix is given by:

$$G(S)=\hat{H}(S)^H(\hat{H}(S)\hat{H}(S)^H)^{-1}\mathrm{diag}(p)^{1/2} \quad (11)$$

where $S=\{s_1, \ldots, s_{|S|}\}$ is the set of user equipments selected for transmission, $\hat{H}(S)=[\hat{h}_{s_1}^T, \ldots, \hat{h}_{s_{|S|}}^T]^T$ represents the concatenated quantised channel vectors of the selected user equipments and $p=(p_{s_1}, \ldots, p_{s_{|S|}})^T$ is the vector of power normalisation coefficients that impose the power constraint on the transmitted signal. As the total power P is assumed to be allocated equally to each transmit antenna, therefore:

$$p_k = \frac{P}{|S|} \frac{1}{\|f_k\|^2} \quad (12)$$

where $f_k$ denotes the k-th column of $F(S)=\hat{H}(S)^H(\hat{H}(S)\hat{H}(S)^H)^{-1}$.

Denote with R(S) the achievable sum-rate when the set of user equipments S is selected for transmission and the amount of transmit antennas is $M_t$. Then, the scheduling method for user selection can be described as follows:

TABLE I

Scheduling Algorithm

Initialise $S = \emptyset$ and $R(S) = 0$
While $|S| \leq M_t$
1) find $k^* = \arg\max_{k \notin S} R(S \cup \{k\})$
2) if $R(S \cup \{k^*\}) > R(S)$ update $S = S \cup \{k^*\}$ In scheduling stage, R(S) may be computed as:

$$R(S) = \sum_{k \in S} \log_2(1 + \gamma_k) \quad (13)$$

where $\gamma_k$ is the Signal to Interference and Noise Ratio (SINR) of user k and given by:

$$\gamma_k = \frac{p_k}{P/M_t} CQI_k. \quad (14)$$

In the method according to an embodiment of the invention, at the scheduling stage, as described just described here above, the Base Station exploits $\tilde{h}_k$ instead of $\hat{h}_k$ to determine or select the user equipments for further transmission.

Figure 4:
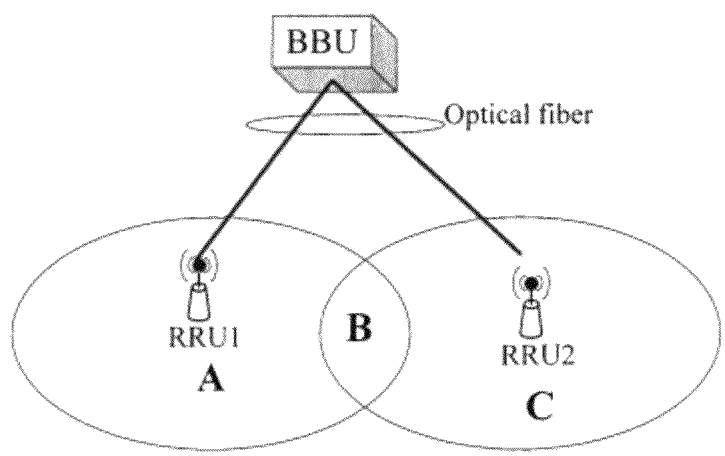
FIG. 4 schematically illustrates a system according to an embodiment of the present invention.

Example performance of the method according to an embodiment of the invention in comparison with existing solutions:

System throughput defined in equation (13) is investigated by the simulation according to the system model shown in FIG. 4 where the BBU connects two RRUs that cover three areas named as A, B C, respectively. To simplify the simulation, we assume that the UEs in the same area have the same distance to the given RRU. For instance, the distance between all the UEs in A and RRU2 is considered to be a constant. Similarly, the UEs in A have the constant distance to RRU1. In addition, it is assumed that there is no penetration loss and shadow fading between the RRU and the UEs in its coverage. For example, it is assumed that the UEs in A have no penetration loss and shadow fading to RRU1, but there is penetration loss and shadow fading between RRU1 and the UEs in C.

In the performance evaluation, four scenarios are considered:

(I) UEs are located in A
(II) UEs are equally located in A and C
(III) UEs are equally located in A, B and C
(IV) UEs are equally located in A and B.

Other simulation parameters are listed in Table II.

TABLE II

| Simulation Parameters | |
| --- | --- |
| Number of antennas per RRU | 2, 4 |
| Number of antennas per UE | 1 |
| Shadowing model | log-normal random variable, standard deviation = 8.0 dB |
| Fading model | Flat Rayleigh fading |
| Distance between RRU1 and UEs in area A | 5 m |
| Distance between RRU1 and UEs in area B | 100 m |
| Distance between RRU1 and UEs in area C | 200 m |
| Distance between RRU2 and UEs in area A | 200 m |
| Distance between RRU2 and UEs in area B | 100 m |
| Distance between RRU2 and UEs in area C | 5 m |
| Distance dependent path loss | $126.3 + 38 \times \log_{10}(d)$ dB |
| Penetration loss | 40 dB |
| Radio Receiver Sensitivity | −110 dBm |
| Transmit Power per RRU | 20 dBm |
| Noise Power | −104 dBm |
| Bits for feedback | 4 |

Figure 5:
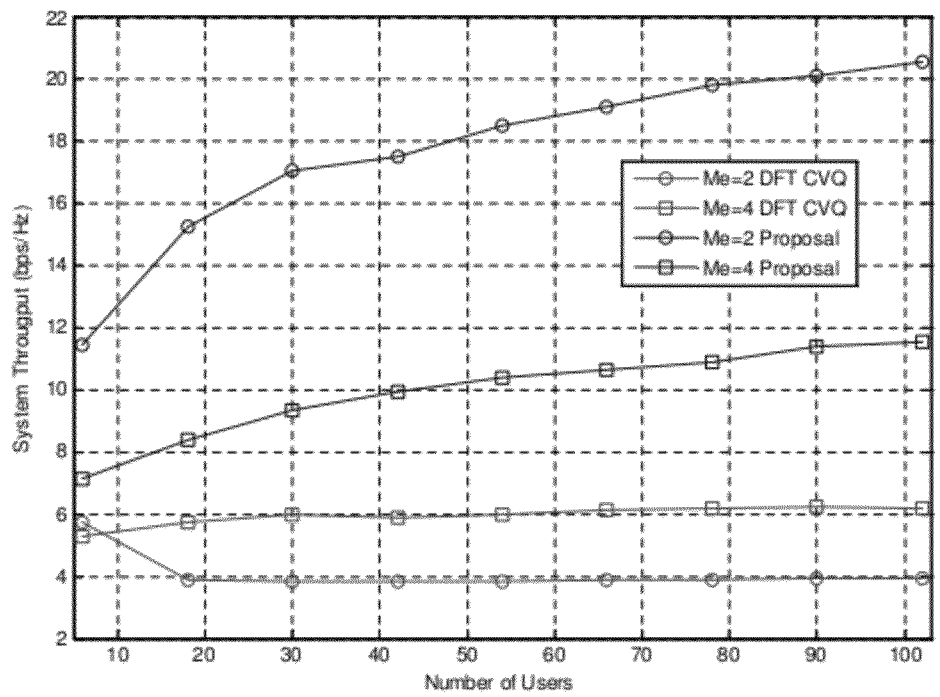
FIG. 5 is a graph illustrating system throughput in a scenario I.

As shown in FIG. 5, our method offers considerable gains of 100%-400% over the CVQ method as the amount of antennas per RRU is 2. As each RRU has 4 antennas, the achievable throughput improvement is in the order of 50%-100%. We also observe that there is no obvious augment in the throughput of CVQ method even if the number of users is relatively large.

Figure 6:
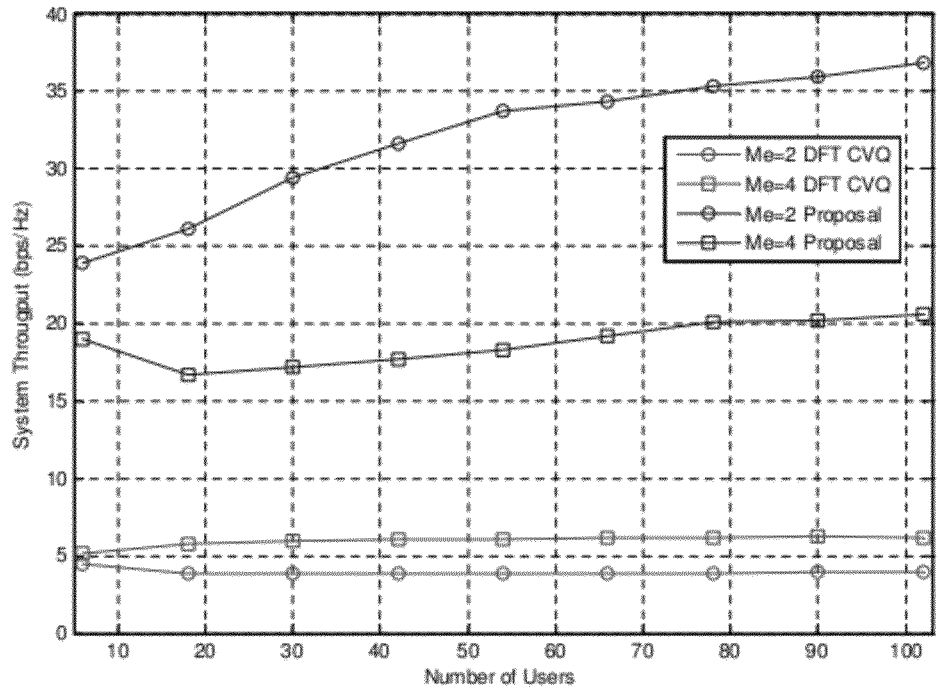
FIG. 6 is a graph illustrating system throughput in a scenario II.

FIG. 6 presents the system throughput achieved in scenario II. It is observed that our proposal achieves higher throughout as compared with scenario I, whereas the throughput of CVQ method is close to that in scenario I. Then, our method obviously outperforms the CVQ method with higher gain. Therefore, the improvement on quantization error in CDI feedback can give rise to more significant enhancement on system throughput, which is at most 300% and 600% in the case that each RRU has 2 or 4 antennas, respectively.

Figure 7:
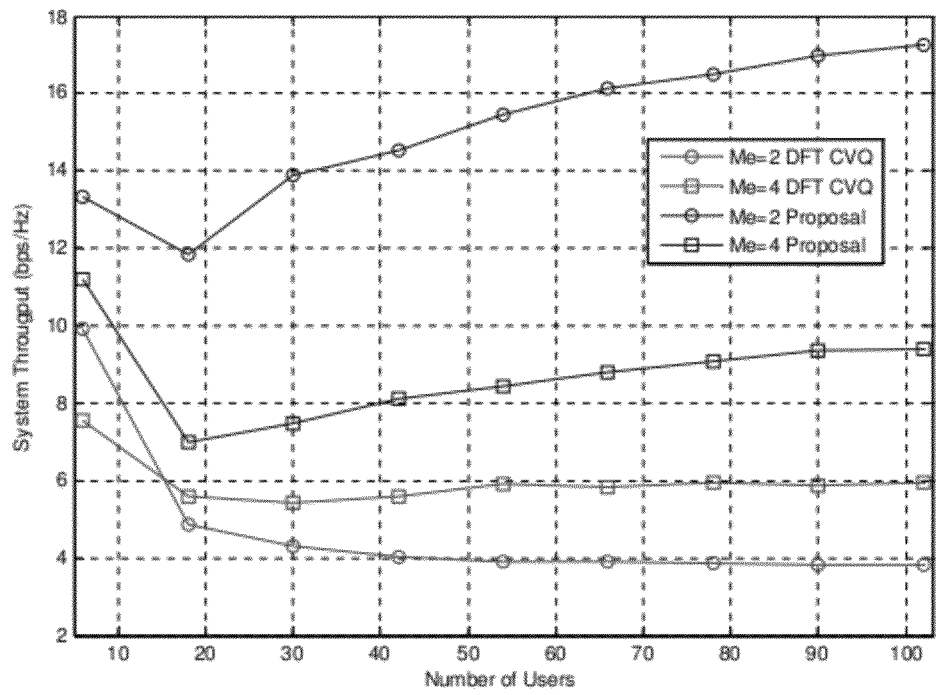
FIG. 7 is a graph illustrating system throughput in a scenario III.

FIG. 7 illustrates the comparison between the proposal and CVQ in terms of system throughput in scenario III. The performance gain achieved by our proposal is relatively large as there are more users in the cell. However, in the case of moderate number of users (i.e. about 20 users), the performance gain reduces to approximately 20%.

Figure 8:
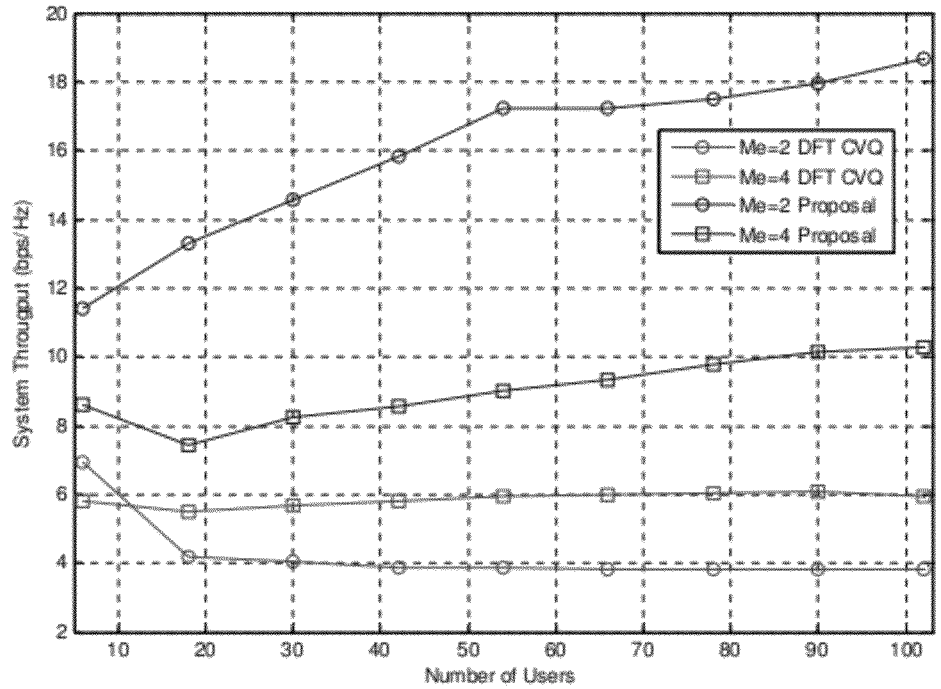
FIG. 8 is a graph illustrating system throughput in a scenario IV.

The throughput of our proposal and CVQ method with the varying number of users in scenario IV is shown in FIG. 8. The performance gain obtained by our proposal is close to that achieved in scenario III. These results can be explained by the analysis mentioned above. However, since there are more UEs located in area A where the UEs can report more accurate CDI, the minimum throughput improvement of our proposal just reduces to about 30%.

Although the present disclosure has been described with reference to one or more examples, workers skilled in the art will recognize that changes may be made in form and detail without departing from the scope of the disclosure and/or the appended claims.

The invention claimed is:

1. A method of scheduling a signal transmission to a user equipment in a transmitter system, said transmitter system comprising a plurality of spatially distributed transmitters for transmitting signals to said user equipment and a base station for controlling said plurality of spatially distributed transmitters, said method comprising, for said base station:
obtaining for the user equipment a quantization vector estimating the state of the channel between the transmitter system and the user equipment,
obtaining for the user equipment a weighting factor representing an attenuation of the channel between the user equipment and at least one of the plurality of spatially distributed transmitters,
scheduling by the base station a signal transmission to the user equipment using the obtained quantization vector weighted with the obtained weighting factor,
wherein obtaining for the user equipment a weighting factor further comprises building an invisibility vector representing the transmitters the user equipment is within the coverage of.

2. A method according to claim 1, wherein scheduling a signal transmission to the user equipment further comprises using the quantization vector weighted by the invisibility vector for scheduling.

3. A method according to claim 1, said method further comprising receiving from the user equipment at least one reference signal, said reference signal identifying the transmitters the user equipment is within the coverage of and being further used for building the invisibility vector.

4. A method according to claim 1, said method further comprising receiving a channel quality information CQI computed by the user equipment and further used for scheduling.

5. A transmitter system for scheduling a signal transmission to a user equipment, said transmitter system comprising:
a plurality of spatially distributed transmitters for transmitting signals to said user equipment,
at least one user equipment, and,
a base station for controlling said plurality of spatially distributed transmitters, wherein said base station is configured to:
obtain for the user equipment a quantization vector estimating the state of a channel between the transmitter system and the user equipment,
obtain for the user equipment a weighting factor representing an attenuation of the channel between the user equipment and at least one of the plurality of spatially distributed transmitters, wherein obtaining for the user equipment a weighting factor further comprises building an invisibility vector representing the transmitters the user equipment is within the coverage of, and
schedule a signal transmission to the user equipment using the obtained quantization vector weighted with the obtained weighting factor.

6. A base station for scheduling a signal transmission to a user equipment in a transmitter system, said transmitter system comprising a plurality of spatially distributed transmitters for transmitting signals to said user equipment and the base station for controlling said plurality of spatially distributed transmitters, wherein the base station is configured to:
obtain for the user equipment a quantization vector estimating the state of a channel between the transmitter system and the user equipment,
obtain for the user equipment a weighting factor representing an attenuation of the channel between the user equipment and at least one of the plurality of spatially distributed transmitters, and
schedule a signal transmission to the user equipment using the obtained quantization vector weighted with the obtained weighting factor,
wherein the base station is further configured to build an invisibility vector representing the transmitters the user equipment is within the coverage of.

7. A base station according to claim 6, wherein the base station is further configured to use the quantization vector weighted by the invisibility vector for scheduling.

8. A base station according to claim 6, wherein the base station is further configured to receive from the user equipment at least one reference signal, said reference signal identifying the transmitters the user equipment is within the coverage of and being further used for building the invisibility vector.

9. A base station according to claim 6, wherein the base station is further configured to receive a channel quality information CQI computed by the user equipment and further used for scheduling.

10. A user equipment k configured for use in a transmitter system, said transmitter system comprising a base station and a plurality of spatially distributed transmitters for transmitting signals to said user equipment, wherein said user equipment k comprises:
an input to receive a reference signal;
and wherein the user equipment is configured to compute a channel quality information CQI according to:

$$CQI_k^{new} = \frac{|R_k \cdot \tilde{h}_k^H|^2}{N_0 + |R_k \times \tilde{h}_k^H|^2}$$

where $\tilde{h}_k^H$ is an obtained quantization vector weighted with an obtained weighting factor, wherein the weighting factor comprises an invisibility vector representing the transmitters the user equipment k is within the coverage of, $R_k = \sqrt{P/M_t} h_k$ is the reference signal received by the user equipment k, $h_k$ is the obtained quantization vector, $M_t$ is the number of the transmission antennas of the transmitter system, P is a transmission power of the base station and $N_0$ is noise power.

11. A non-transitory computer-readable medium having computer-executable instructions to enable a computer system to perform a method of scheduling a signal transmission to a user equipment in a transmitter system, said transmitter system comprising a plurality of spatially distributed transmitters for transmitting signals to said user equipment and a base station for controlling said plurality of spatially distributed transmitters, said method comprising, for said base station:
- obtaining for the user equipment a quantization vector estimating the state of the channel between the transmitter system and the user equipment,
- obtaining for the user equipment a weighting factor representing an attenuation of the channel between the user equipment and at least one of the plurality of spatially distributed transmitters,
- scheduling by the base station a signal transmission to the user equipment using the obtained quantization vector weighted with the obtained weighting factor,
- wherein obtaining for the user equipment a weighting factor further comprises building an invisibility vector representing the transmitters the user equipment is within the coverage of.

* * * * *